United States Patent [19]
Yokoi

[11] Patent Number: 6,139,010
[45] Date of Patent: *Oct. 31, 2000

[54] SHEET CONVEY APPARATUS

[75] Inventor: Katsuyuki Yokoi, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/804,756

[22] Filed: Feb. 24, 1997

Related U.S. Application Data

[63] Continuation of application No. 08/242,846, May 16, 1994, abandoned.

[30] Foreign Application Priority Data

May 19, 1993 [JP] Japan ..................................... 5-117167

[51] Int. Cl.[7] .............................. B65H 5/00; B65H 9/04
[52] U.S. Cl. ........................... 271/225; 271/242; 271/902
[58] Field of Search .................................... 347/104, 237, 347/247, 49; 399/16, 68; 271/117, 118, 274, 902, 10.12, 10.11, 121, 25, 114, 22, 10.04, 225, 242; 475/211, 289, 312

[56] References Cited

U.S. PATENT DOCUMENTS

| | | |
|---|---|---|
| 3,966,198 | 6/1976 | Komada et al. . |
| 4,529,188 | 7/1985 | Sturnick . |
| 4,544,294 | 10/1985 | Rünzi . |
| 4,581,618 | 4/1986 | Watanabe et al. . |
| 4,638,987 | 1/1987 | Sakurai . |
| 4,691,911 | 9/1987 | Nakagawa et al. . |
| 4,721,297 | 1/1988 | Katayama . |
| 4,798,374 | 1/1989 | Ito . |
| 4,866,531 | 9/1989 | Kobori et al. . |
| 4,884,909 | 12/1989 | Watanabe et al. . |
| 4,953,037 | 8/1990 | Ito et al. . |
| 5,184,902 | 2/1993 | Harada et al. . |
| 5,211,690 | 5/1993 | Mizoguchi et al. . |

FOREIGN PATENT DOCUMENTS

| | | |
|---|---|---|
| 069384 | 1/1983 | European Pat. Off. . |
| 55-132258 | 10/1980 | Japan . |

*Primary Examiner*—John Barlow
*Assistant Examiner*—Raquel Yvette Gordon
*Attorney, Agent, or Firm*—Fitzpatrick, Cella, Harper & Scinto

[57] ABSTRACT

A sheet convey apparatus comprises first convey means for conveying a sheet, second convey means for pinching and conveying the sheet conveyed by the first convey means, and a drive rotary member shiftable between a first position where the first convey means is driven by the drive rotary member and a second position where the second convey means is driven by the drive rotary member. After a tip end of the sheet conveyed by the first convey means is abutted against a nip of the second convey means to correct skew-feed of the sheet, the sheet is conveyed by the second convey means.

19 Claims, 12 Drawing Sheets

SHEET CONVEY APPARATUS

This application is a continuation of application Ser. No. 08/242,846 filed May 16, 1994, now abandoned.

BACKGROUND OF THE INVENTION

1. Field of the Invention

The present invention relates to a sheet convey apparatus for conveying a sheet as a recording material in a recording apparatus (printer) as an information output device for a computer and the like, or in an image forming apparatus such as a copying machine, a facsimile machine and the like.

2. Related Background Art

In conventional sheet convey apparatuses having a mechanism for conveying a sheet as a recording material picked up by a sheet supply roller to a convey roller and used with recording apparatuses, there was the following method for transmitting a driving force to the sheet supply roller. Such method will now be explained with reference to FIGS. 14 to 17. FIG. 14 is a sectional view of a sheet supply portion of a conventional recording apparatus, and FIGS. 15 to 17 are views showing a driving force transmitting mechanism for the recording apparatus.

In FIG. 14, the recording apparatus comprises a convey roller 1, a pinch roller 2 urged against the convey roller 1 to generate a conveying force, a pinch roller holder 3 mounted for pivotal movement around an axis (not shown) and adapted to hold the pinch roller 2, a pinch roller spring 4 for biasing the pinch roller holder 3 to urge the pinch roller against the convey roller, a sheet supply roller 5 having a sheet supply roller shaft 6, an idle roller 7 rotatably mounted on the sheet supply roller shaft 6, a friction piece 8 urged against the sheet supply roller and the idle roller to separate sheets (recording materials) 12, a friction piece spring 9 for urging the friction piece against the rollers, a pressure plate 10 on which the sheets are stacked and which serves to urge the sheet stack against the sheet supply roller upon supply of sheet, and a pressure plate spring 11 for biasing the pressure plate toward the sheet supply roller.

FIG. 15 shows a driving force transmitting mechanism used with the arrangement shown in FIG. 14. In FIG. 15, the driving force transmitting mechanism includes a drive motor 13 comprised of a pulse motor, a motor gear 14 secured to a shaft of the drive motor, a convey roller gear 15 mounted on a shaft of the convey roller, idle gears 16, 17, and a sheet supply roller gear (clutch gear) 18 rotatably mounted on the sheet supply roller shaft 6. The motor gear 14 is meshed with the convey roller gear 15 which is in turn connected to the sheet supply roller gear 18 through the idle rollers 16, 17. Accordingly, when the motor gear 14 is rotated normally in a direction shown by the arrow a by normal rotation of the motor 13 (in the direction a), the convey roller gear 15 and the sheet supply roller gear 18 are also rotated normally. As a result, when a spring clutch 23 (described later) is in a clutch-on condition, the sheet supply roller 5 is rotated in a normal direction corresponding to a sheet feeding out direction (sub scan direction). Further, the convey roller 1 is also rotated in the normal direction corresponding to the sheet feeding out direction.

FIG. 16 is a side view of the spring clutch 23 provided on the sheet supply roller shaft 6, and FIG. 17 is a sectional view taken along the line 17—17 of FIG. 16. In FIG. 16, as mentioned above, the sheet supply roller gear 18 is rotatably mounted on the sheet supply roller shaft 6. A clutch drum 19 is fitted on the sheet supply roller shaft 6 in a confronting relation to the sheet supply roller gear 18 so that the clutch drum 19 cannot be rotated with respect to the shaft 6 by means of an idle rotation preventing pin 21. A cam portion 19A is integrally formed with the clutch drum 19. Stopper members 22, 24 serve to prevent the clutch drum 19 and the sheet supply roller gear 18 from shifting in a thrust direction. A coil-shaped clutch spring 25 is wound around a barrel 19B of the clutch drum 19 and a barrel 18B of the sheet supply roller gear 18. A control ring 20 surrounds the clutch spring 25.

An end of the clutch spring 25 near the clutch drum 19 is secured to the clutch drum 19, and the other end of the clutch spring is connected to the control ring 20. A lock lever 20A is integrally formed with the control ring 20. A stopper 26 is associated with the lock lever 20A and is driven by a solenoid (not shown).

In a clutch-off condition, the lock lever 20A of the control ring 20 is caught by the stopper 26 to prevent rotation of the control ring 20. As a result, the clutch spring 25 is loosen with respect to the barrel 18B of the sheet supply roller gear 18 to permit idle rotation of the sheet supply roller gear 18 on the shaft 6, with the result that the rotational force of the sheet supply roller gear 18 is not transmitted to the shaft 6. Accordingly, in this condition, even when the sheet supply roller gear 18 is being rotated, the sheet supply roller 5 is not rotated and is maintained in a stopped condition.

In the clutch-on condition, the stopper 26 is retarded from a movement path of the lock lever 20A of the control ring 20, thereby permitting the rotation of the control ring 20. As a result, the clutch spring 25 is tightened against the barrel 18B of the sheet supply roller gear 18, so that the sheet supply roller gear 18 is integrally connected to the clutch drum 19 via the clutch spring 25, with the result that the rotational force of the gear 18 is transmitted to the shaft 6 to rotate it together with the sheet supply roller gear 18, thereby rotating the sheet supply roller 5.

When a print signal is inputted to a control circuit (not shown) of the recording apparatus, the stopper 26 is retracted to release the spring clutch 23, thereby creating the clutch-on condition. Further, the motor 13 is rotated in the normal direction. As a result, the sheet supply roller 5 is rotated in the normal direction and the convey roller 1 is also rotated in the normal direction. Further, the downward biasing of the pressure plate 10 is released by rotation of the cam 19A, with the result that the pressure plate is lifted by the pressure plate spring 11 to urge a front end portion of the sheet stack 12 against a cylindrical peripheral portion of the sheet supply roller 5 which is now being rotated normally. Then, an uppermost sheet in the sheet stack 12 is picked up and conveyed by the further rotation of the sheet supply roller to be sent to the convey roller 1. If the other sheet(s) is picked up together with the uppermost sheet, the friction piece 8 serves to prevent the other sheet(s) from being sent to the convey roller.

In order to prevent the skew-feed of the sheet, after a tip end of the sheet supplied by the sheet supply roller 5 passes through a nip between the convey roller 1 and the pinch roller 2, when the sheet is conveyed in the sheet conveying direction by a predetermined amount in a condition that the sheet stack is urged against the sheet supply roller by means of the pressure plate, the motor 13 is rotated reversely. By doing so, since the clutch spring is loosen not to transmit the driving force to the sheet supply roller 5, the tip end of the sheet is returned to the nip between the convey roller 1 and the pinch roller 2 in a condition that a rear end portion of the sheet is held by the sheet supply roller 5. Then, the motor 13 is rotated normally again.

However, in the above-mentioned conventional technique, since the spring clutch is used to transmit the driving force to the sheet supply roller, the number of parts in the driving force transmitting mechanism is increased. Further, in order to ensure the reliability of the operation of the driving force transmitting mechanism, since the parts must be machined with higher accuracy, the driving force transmitting mechanism becomes expensive.

Further, since the spring clutch is used to prevent the skew-feed of the sheet, after the tip end of the sheet passes through the nip between the convey roller and the pinch roller, the sheet must be returned in the reverse direction and then be conveyed in the normal direction again. In this case, if the picked-up sheet is supplied greatly obliquely, a portion of the sheet will not be completely returned to the nip between the convey roller and the pinch roller during the reverse movement of the sheet, with the result that, even when the skew-feed preventing control is effected, the skew-feed of the sheet is not completely corrected. In order to solve this problem, an amount of the reverse movement of the sheet may be increased; in this case, however, a distance between the sheet supply roller and the convey roller must be increased, thus making the compactness of the apparatus difficult.

SUMMARY OF THE INVENTION

The present invention aims to eliminate the above-mentioned conventional drawbacks, and has an object to provide a sheet convey apparatus having a supply means capable of preventing skew-feed of a sheet with high reliability.

To achieve the above object, sheet convey apparatus according to the present invention comprises a convey roller for conveying a sheet, an urging roller urged against the convey roller to generate a conveying force, a sheet containing portion arranged upstream of the convey roller in a sheet conveying direction for accommodating the sheets, a sheet supply roller for picking up the sheet from the sheet containing portion and for sending the sheet toward the convey roller, a rive shaft for generating a driving force for driving the convey roller and the sheet supply roller, a planetary gear to which the driving force is transmitted from a gear on the drive shaft and which can be engaged by a sheet supply roller gear on a shaft of the sheet supply roller to transmit the driving force to the sheet supply roller when the drive shaft is rotated in a direction opposite to the sheet conveying direction and can be engaged by a convey roller gear on a shaft of the convey roller to transmit the driving force to the convey roller when the drive shaft is rotated in the sheet conveying direction, and control means for controlling rotation of the drive shaft in such a manner that the drive shaft is firstly rotated in the direction opposite to the sheet conveying direction to rotate the sheet supply roller, thereby picking up the sheet from the sheet containing portion and abutting the sheet against a nip between the convey roller and the urging roller which are now stopped and then the drive shaft is rotated in the sheet conveying direction.

DETAILED DESCRIPTION OF THE PREFERRED EMBODIMENTS

Figure 1:
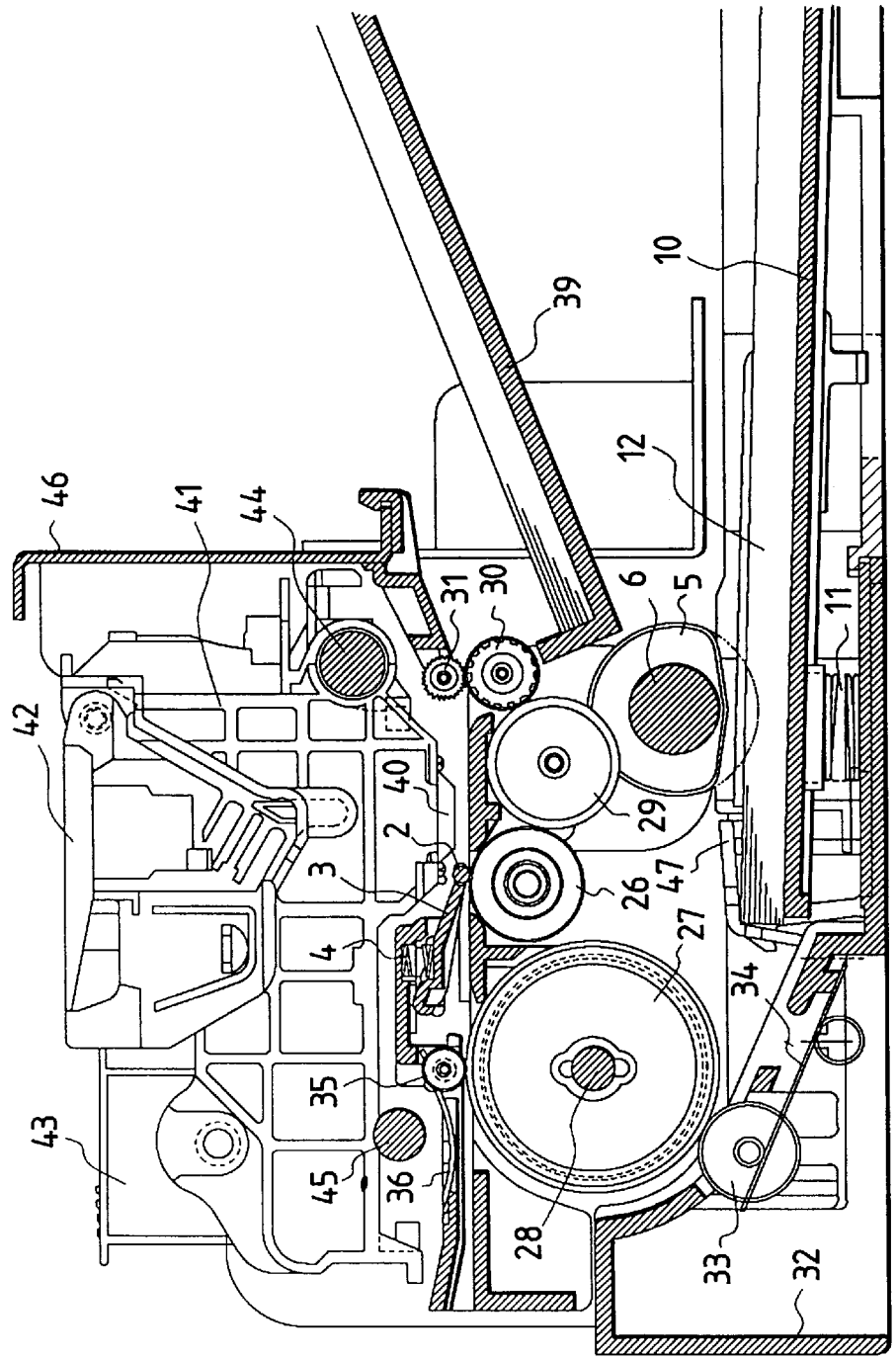
FIG. 1 is a sectional view of an image forming apparatus into which a first embodiment of the present invention (sheet convey apparatus) is incorporated.

FIG. 1 shows an example of a serial recording apparatus to which a sheet convey apparatus according to the present invention is applied and is a sectional view of the recording apparatus in which a recording material (sheet) is conveyed only in one direction.

In FIG. 1, the recording apparatus comprises a first convey roller 26, a pinch roller 2 urged against the convey roller 26 to generate a conveying force, a pinch roller holder 3 for holding the pinch roller 2, a pinch roller spring 4 for biasing the pinch roller holder 3 to urge the pinch roller 2 against the convey roller to generate a conveying force, a sheet supply roller 5 having a sheet supply roller shaft 6, a second convey roller 27 disposed between the first convey roller 26 and the sheet supply roller 5 and having a roller shaft 28, a driven roller 35 urged against the second convey roller 27 to generate a conveying force, and a spring 36 for biasing the driven roller 35 against the second convey roller.

Further, the recording apparatus includes a sheet supply cassette 32 in which recording materials are stacked, an urging roller 33 held by the sheet supply cassette and urged against the second convey roller 27 to generate a conveying force, an urging spring 34 for urging the urging roller 33 against the second convey roller, a pressure plate 10 disposed in the sheet supply cassette to urge the sheet stack accommodated in the cassette against the sheet supply roller, a pressure plate spring 11 for biasing the pressure plate 10 toward the sheet supply roller, a separation pawl 47, a sheet discharge roller 30 for discharging the recording material on which an image was recorded, a transmission roller 29 contacted with peripheral surfaces of the first convey roller 26 and the discharge roller 30 to transmit a rotational force of the first convey roller 26 to the discharge roller 30, a driven roller 31 abutted against the discharge roller 30, and a discharge sheet stacker 39 on which the recording materials on which the images were formed are stacked.

The recording apparatus further includes an ink jet recording head 40, an ink tank 43, a carriage 41 on which the ink jet recording head 40 and the ink tank 43 are mounted and which can be shifted in a main scan direction, a head cover 42 engaged by the carriage 41 to hold the ink jet recording head 40 and the ink tank 43 on the carriage, guide shafts 44, 45 along which the carriage is shifted, and a chassis 46 to which the guide shafts 44, 45 are attached.

The ink jet recording head 40 used in the illustrated embodiment has heat generating elements disposed in nozzles and is designed so that a bubble is created in ink by thermal energy given from the selectively energized heat generating element and an ink droplet is discharged from the nozzle by the growth of the bubble.

Figure 2:
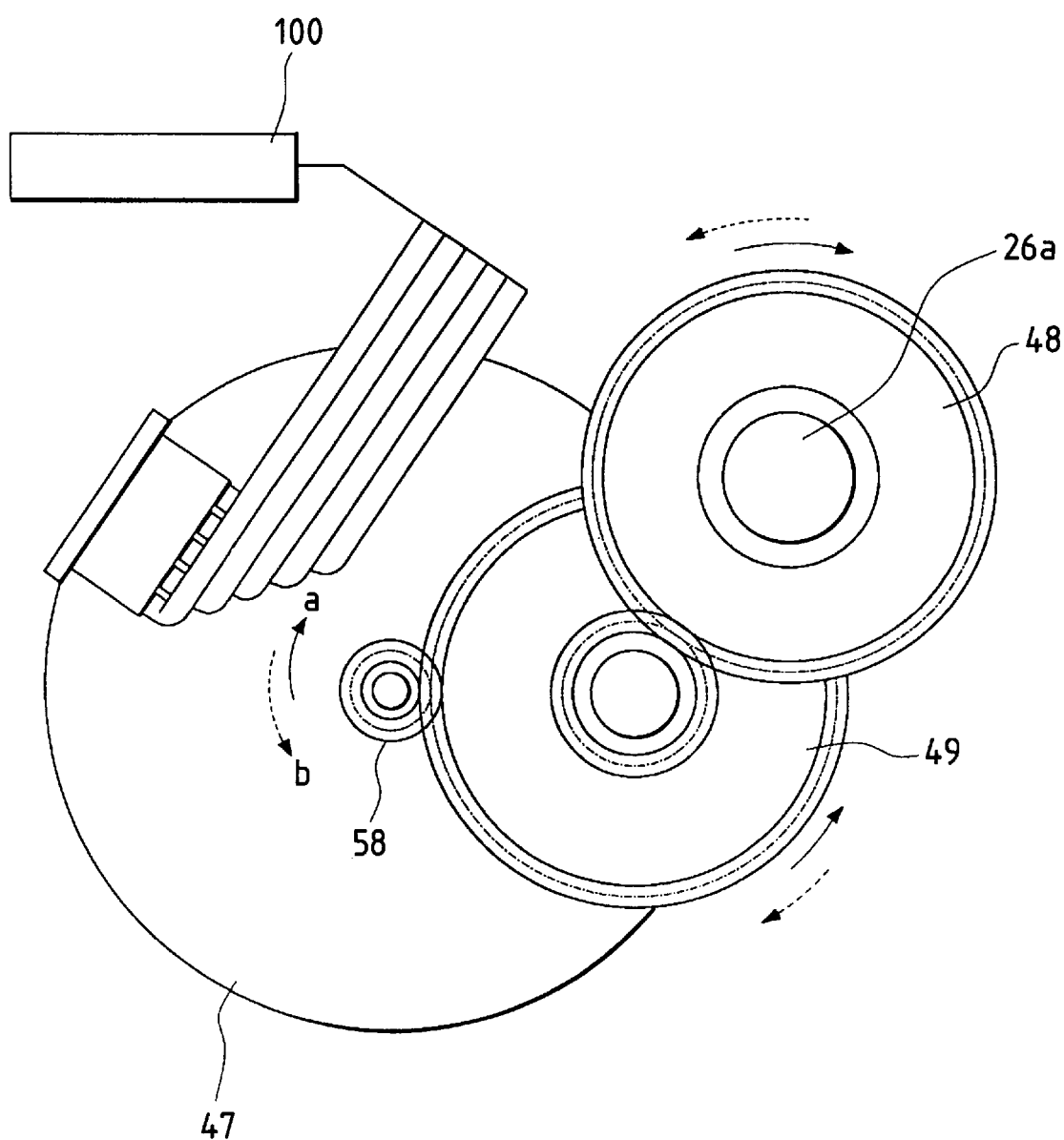
FIG. 2 is a view showing a portion of a drive system according to the first embodiment.
Figure 3:
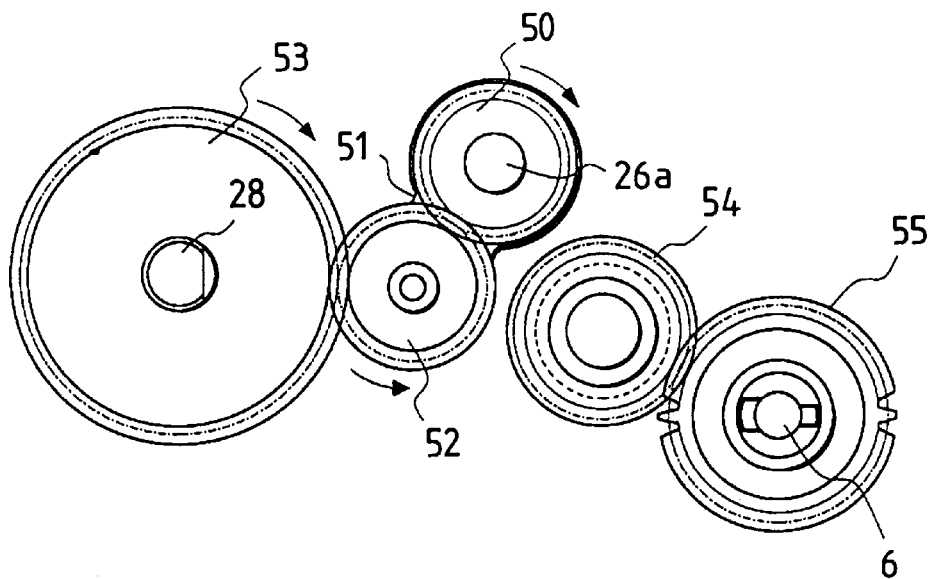
FIGS. 3 and 4 are views for explaining an operation of the drive system according to the first embodiment.
Figure 4:
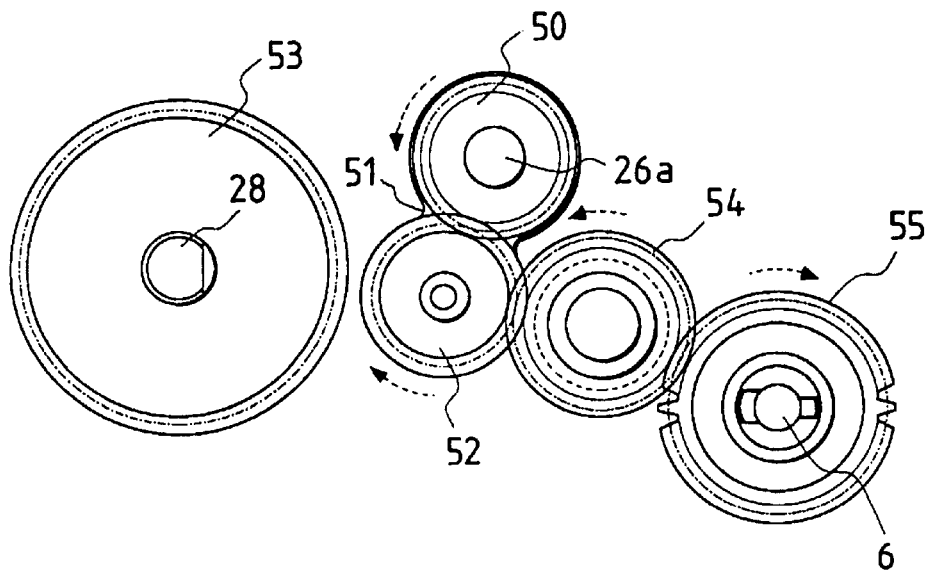

FIGS. 2 to 4 are views for explaining a driving force transmitting mechanism of a convey system of the recording apparatus.

In FIG. 2, the driving force transmitting mechanism includes a drive motor 47, a motor gear 58, an idle gear 49 having two different diameter gear portions, and a roller gear 48 mounted on a roller shaft 26a of the first convey roller 26. As shown, the first convey roller is driven by the drive motor 47. Incidentally, the reference numeral 100 denotes a control circuit for controlling the drive motor 47. In FIGS. 3 and 4, the driving force transmitting mechanism further includes a second roller gear 50 mounted on the roller shaft 26a of the first convey roller 26, a planetary gear 52 meshed with the second roller gear 50 to transmit the driving force from the second roller gear to the planetary gear, a holding member 51 rotatably mounted on the roller shaft 26a of the first convey roller 26 and adapted to hold the planetary gear 52, a convey roller gear 53 mounted on the roller shaft 28 of the second convey roller, a sheet supply roller gear 55 mounted on the sheet supply roller shaft 6, and an idle gear 54.

The planetary gear 52 serves to be meshed with the roller gear 53 on the second convey roller shaft 28 to transmit the driving force of the first convey roller 26 to the second convey roller 27 when the first convey roller 26 is rotated in the sheet conveying direction (FIG. 3) and to be meshed with the idle gear 54 to transmit the driving force of the first convey roller 26 to the sheet supply roller 5 when the first convey roller 26 is rotated in a direction opposite to the sheet conveying direction (FIG. 4).

Figure 5:
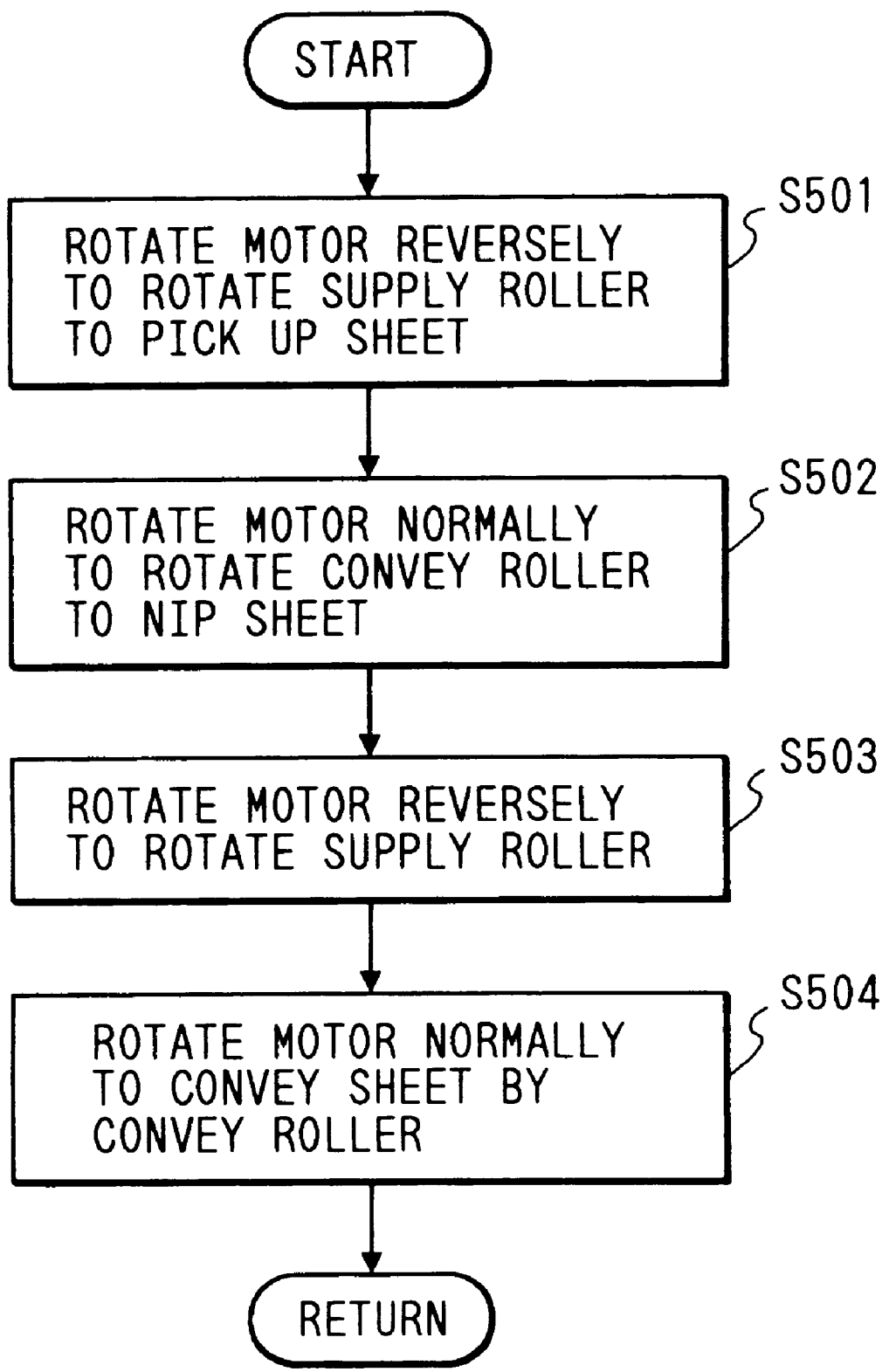
FIG. 5 is a flow chart for explaining the control according to the first embodiment.
Figure 6:
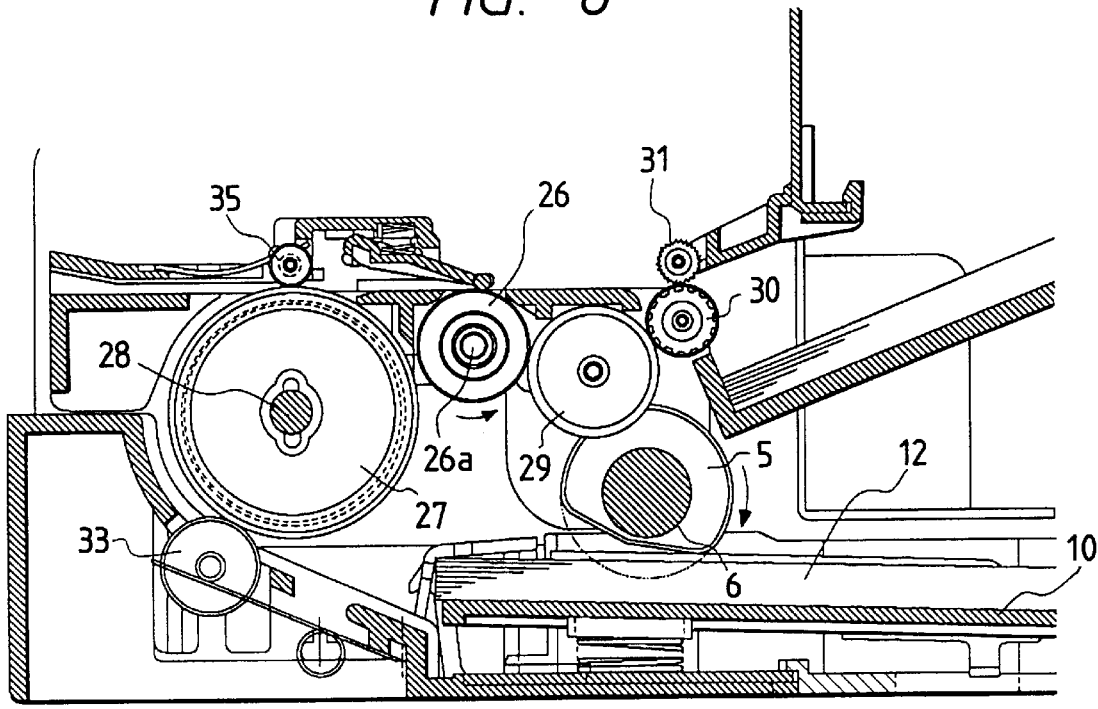
FIGS. 6 to 10 are views for explaining an operation of the drive system according to the first embodiment.

FIG. 5 shows a sequence of the sheet supplying operation of this apparatus, and the sheet supplying operation will be explained with reference to FIGS. 6 to 10.

Figure 7:
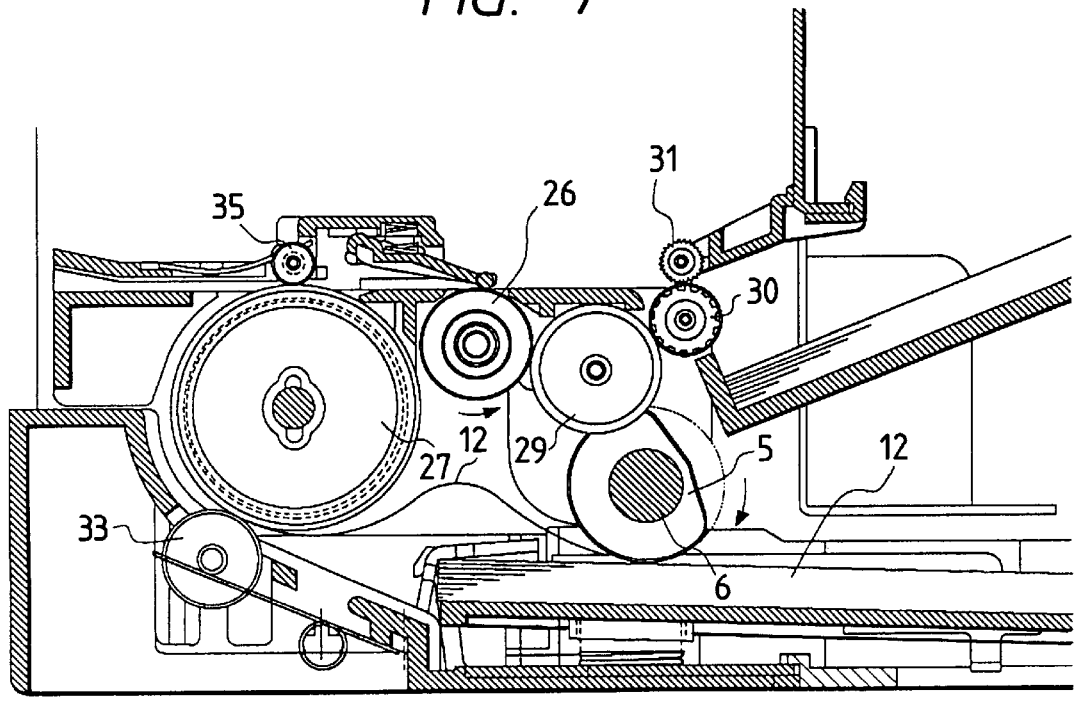
Figure 8:
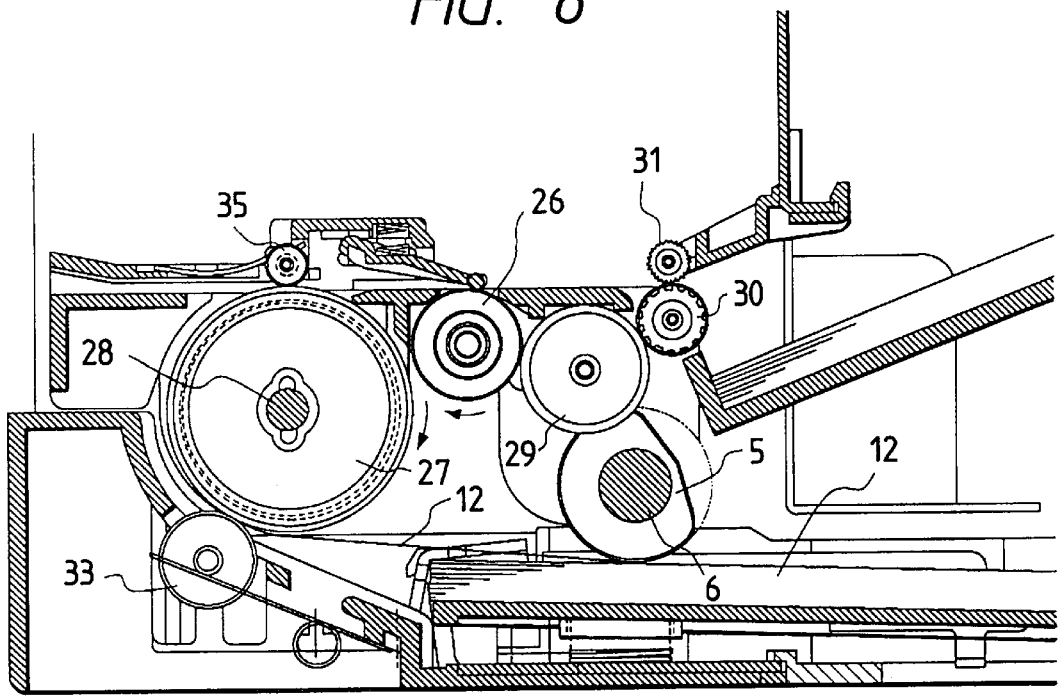

When the sheet supplying operation is started, the drive motor 47 is rotated in the direction opposite to the sheet conveying direction (reverse direction) by a predetermined number of pulses. As a result, the driving force is transmitted from the first convey roller 26 to the sheet supply roller 5 via the planetary gear 52, thereby rotating the sheet supply roller 5 to pick up the recording material (step S501, FIG. 6). When the drive motor is rotated reversely by the predetermined number of pulses, the tip end of the recording material is abutted against a nip between the second convey roller 27 and the urging roller 33 which are now stopped, and the trailing end of the recording material is held by the sheet supply roller 5, thereby forming a loop in the recording material (FIG. 7).

Then, the drive motor 47 is rotated in the normal direction by a predetermined amount. As a result, the sheet supply roller 5 is stopped and the second convey roller 27 is rotated in the sheet conveying direction. Due to this operation, the tip end of the recording material is pulled by the second convey roller 27 and the urging roller 33 so that the recording material can be conveyed in the sheet conveying direction by the second convey roller 27. In this case, since the tip end of the recording material is pulled by the second convey roller 27 in a condition that the tip end of the recording material is abutted against the nip between the second convey roller 27 and the urging roller 33 and the loop is formed in the recording material, i.e. in a condition that the tip end of the recording material is aligned with the nip between the second convey roller 27 and the urging roller 33, the skew-feed of the recording material can be corrected with high accuracy and reliability (step S502, FIG. 8).

Incidentally, the number of pulses applied to the drive motor during its normal rotation is desirably selected so that the second convey roller 27 is not rotated excessively so as to apply a tension force to the recording material between the sheet supply roller 5 and the second convey roller 27.

Figure 9:
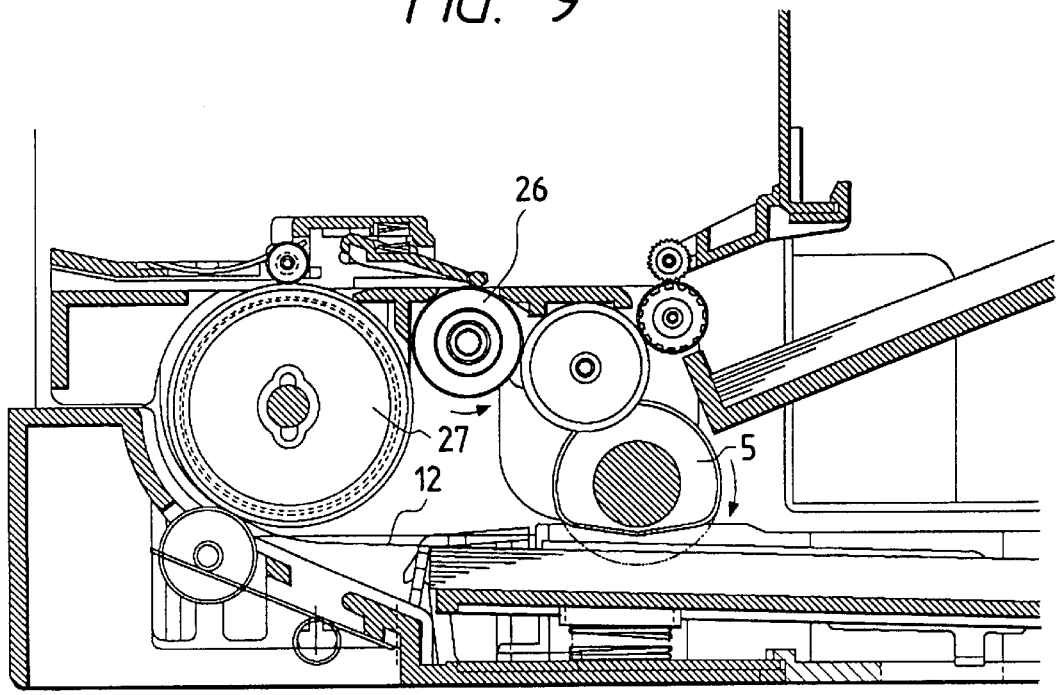
Figure 10:
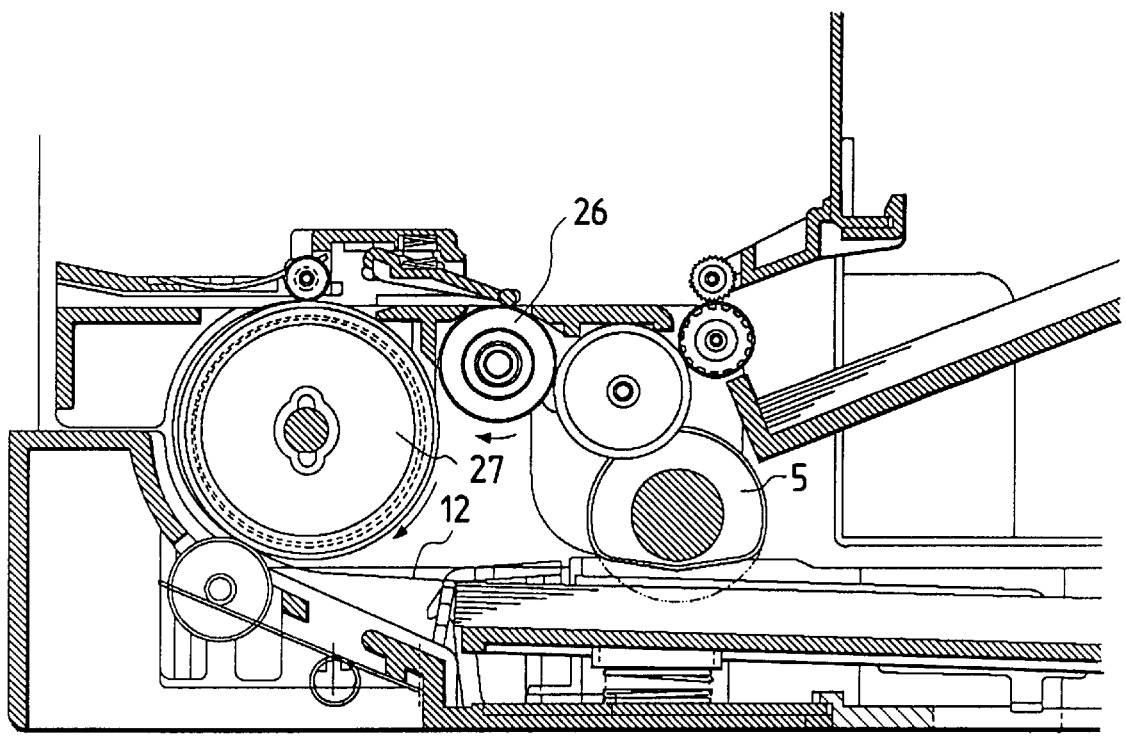

Then, the drive motor 47 is rotated again in the direction opposite to the sheet conveying direction to return the sheet supply roller to its original position (step S503, FIG. 9). Then, the drive motor 47 is rotated in the normal direction to rotate the second convey roller 27 in the sheet conveying direction to convey the recording material, by the first convey roller 26, to a recording position, where an image is recorded on the recording material by the recording head 40 (step S504, FIG. 10).

As mentioned above, in this apparatus, the good sheet supplying ability can be obtained with inexpensive arrangement.

Next, a second embodiment of the present invention will be explained.

Figure 11:
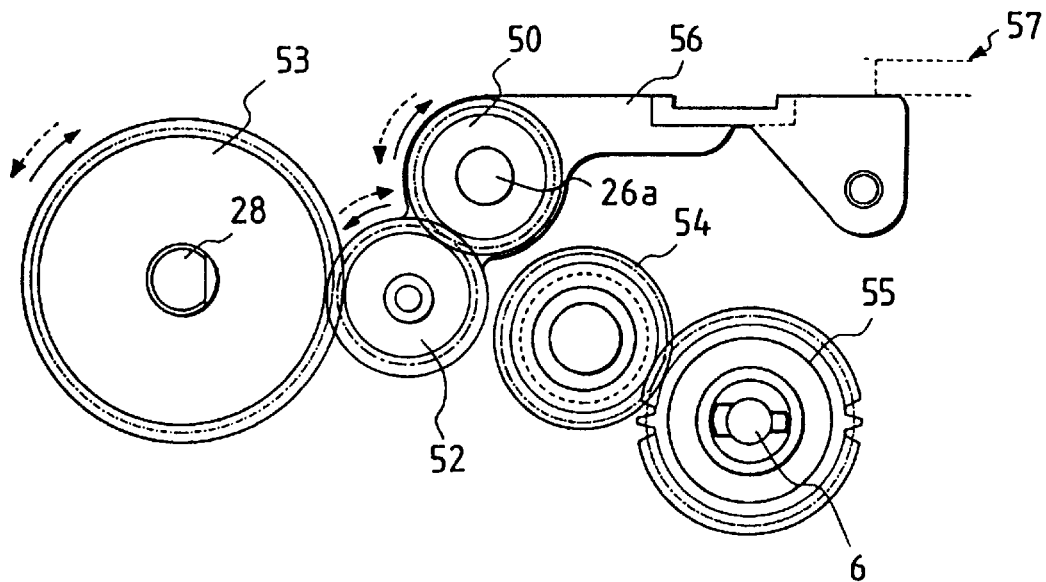
FIGS. 11 and 12 are views for explaining an operation of a drive system according to a second embodiment of the present invention.
Figure 12:
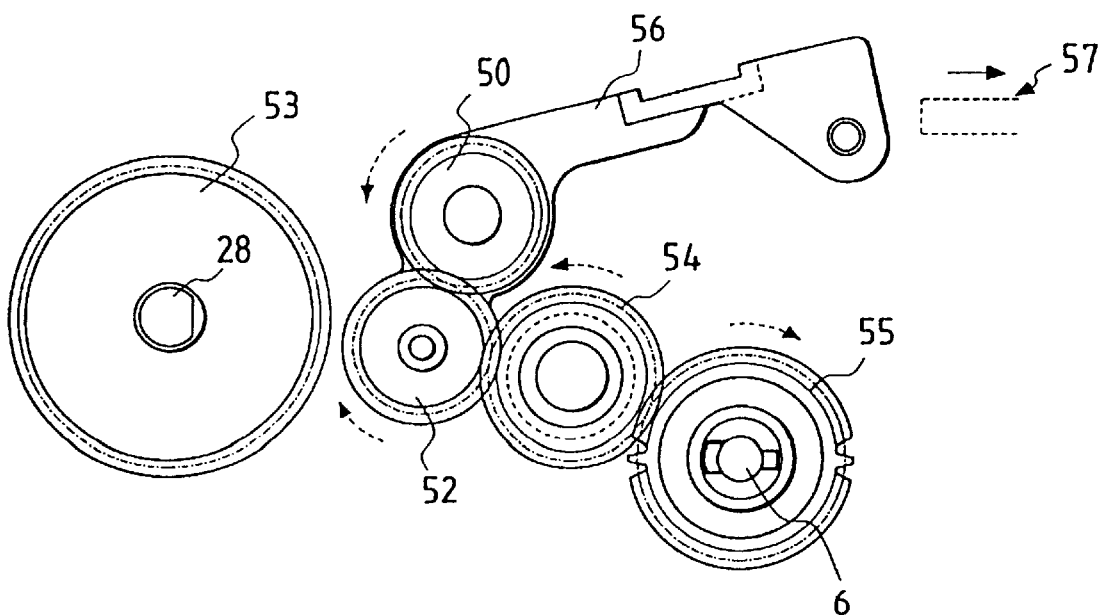
Figure 13:
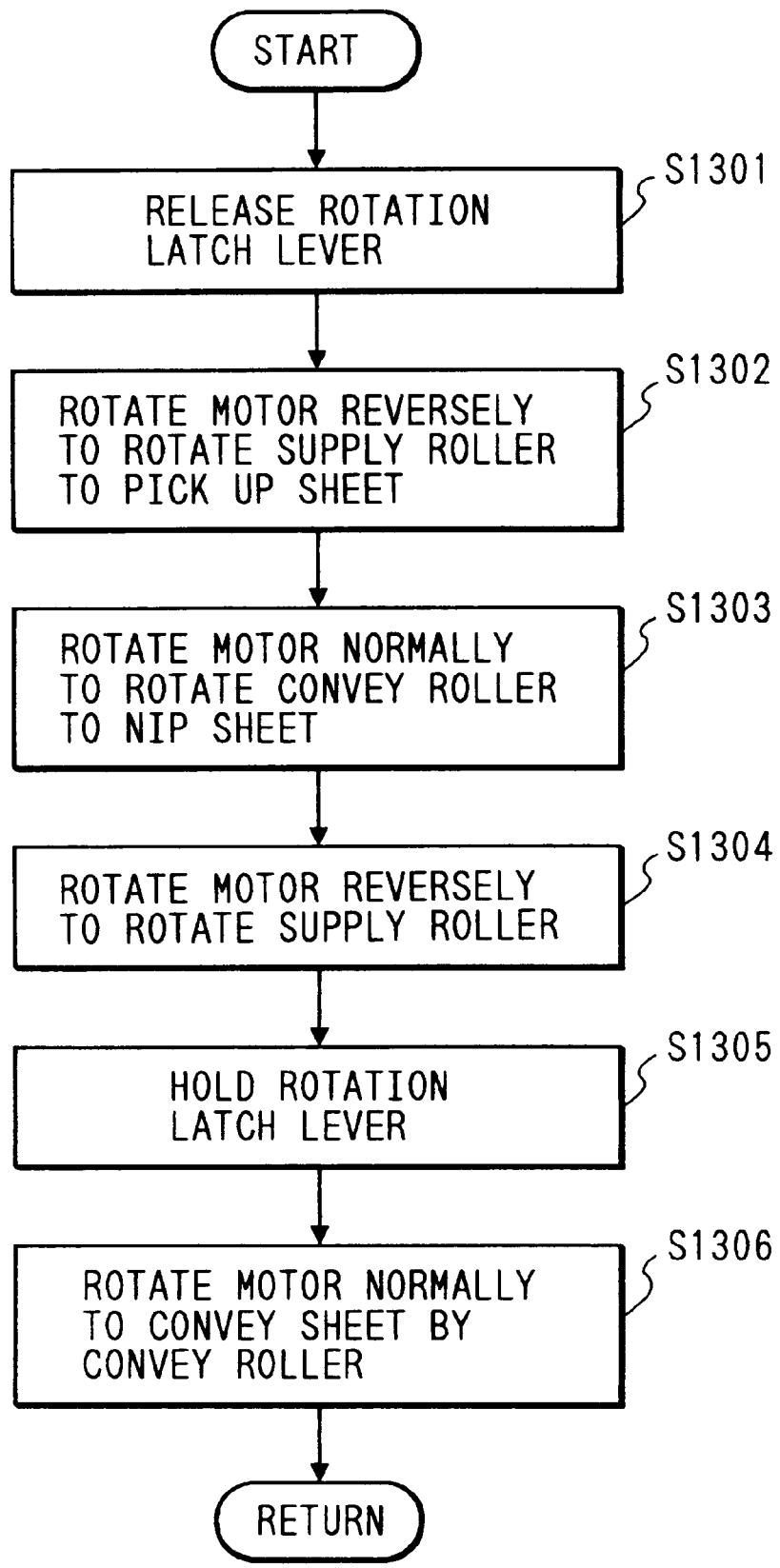
FIG. 13 is a flow chart for explaining the control according to the second embodiment.
Figure 14:
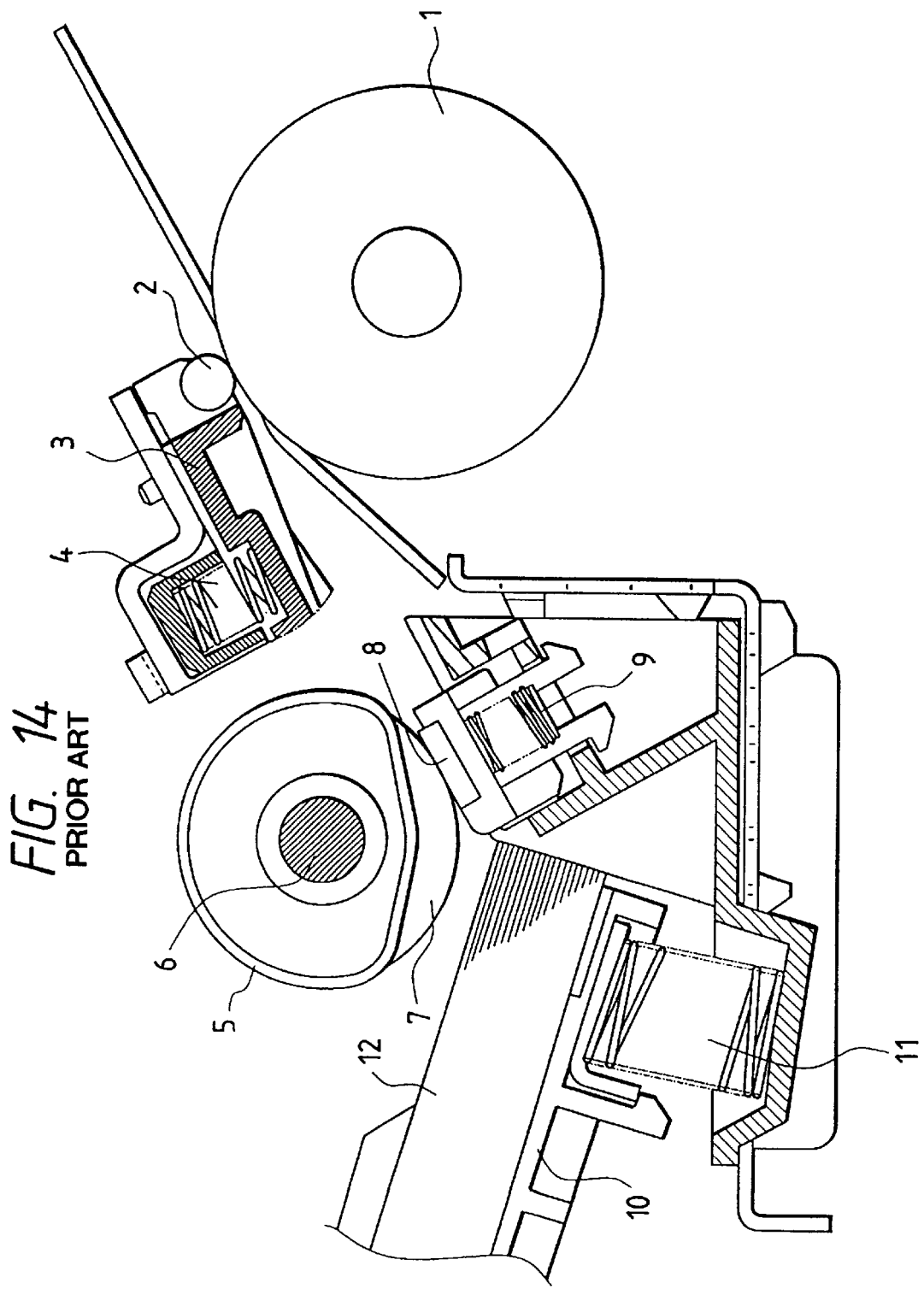
FIG. 14 is a sectional view of a conventional sheet convey apparatus.
Figure 15:
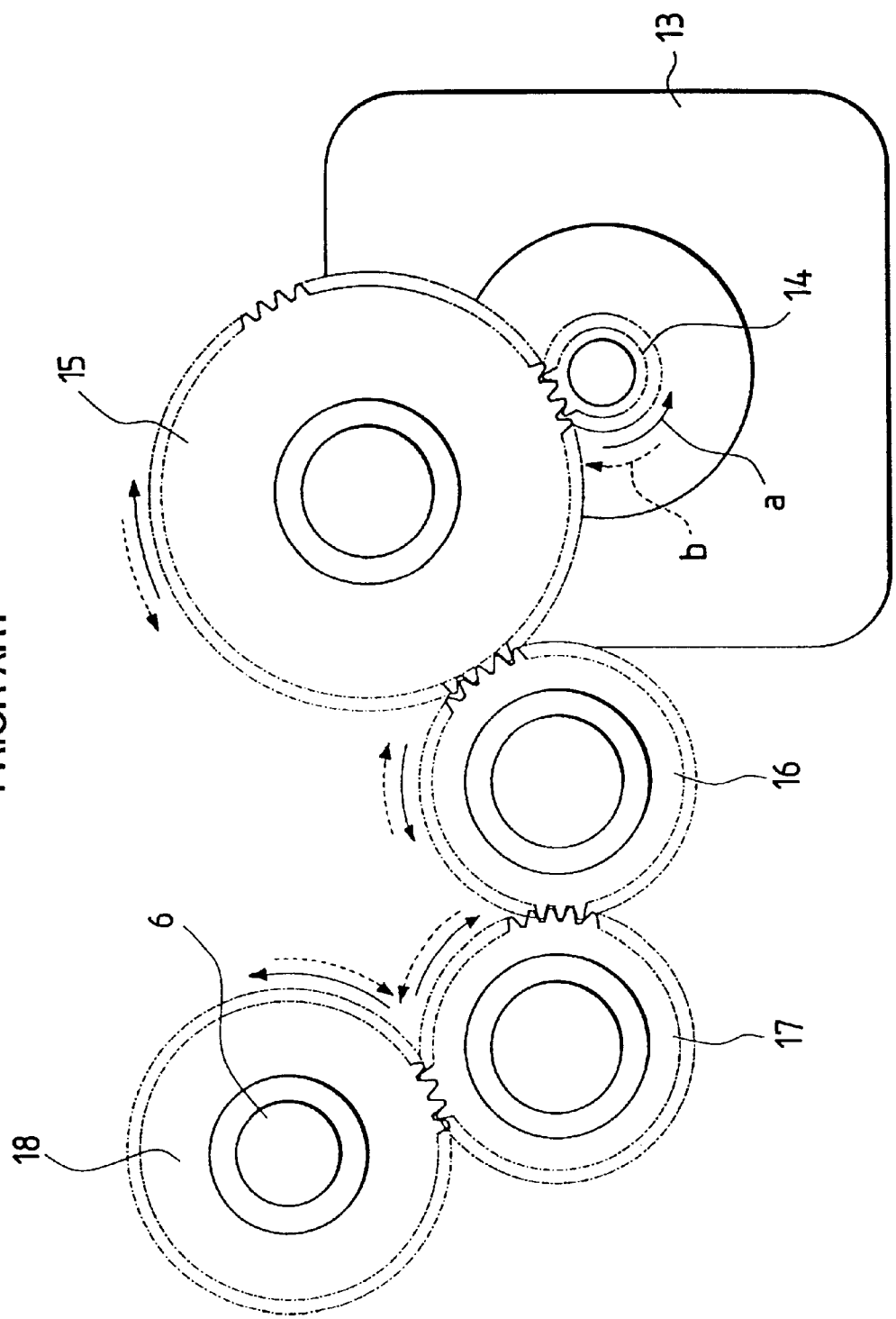
FIG. 15 is a view showing a drive system of the conventional sheet convey apparatus.
Figure 16:
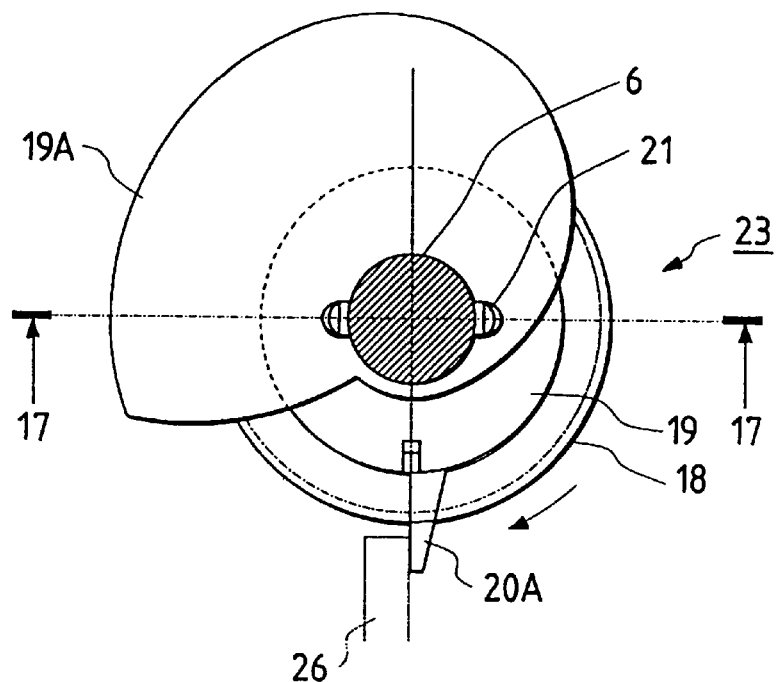
FIG. 16 is a side view showing a portion of the drive system of the conventional sheet convey apparatus.
Figure 17:
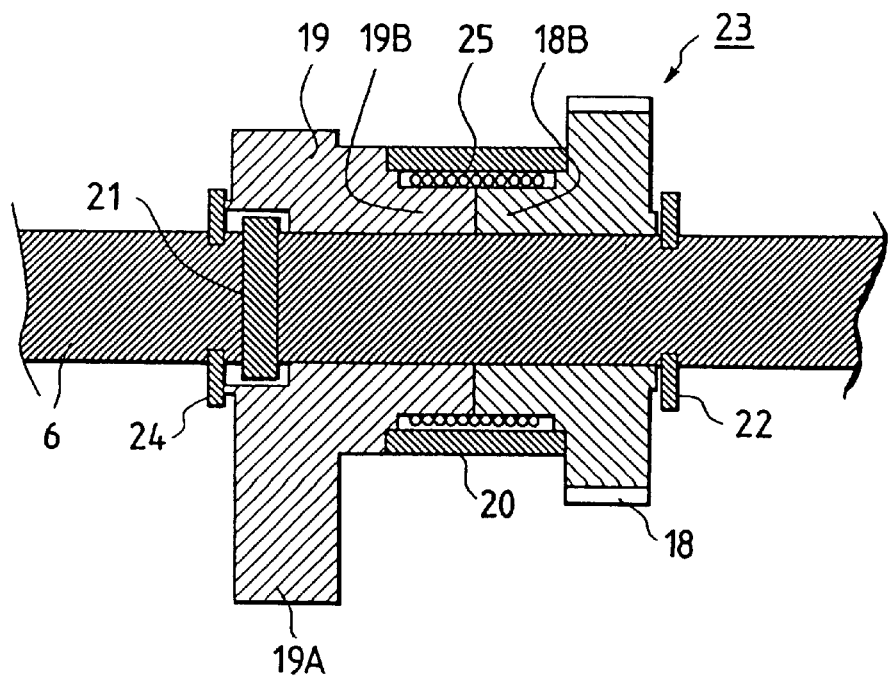
FIG. 17 is a sectional view showing a portion of the drive system of the conventional sheet convey apparatus.

In the first embodiment, while an example that the recording material is supplied only in the sheet conveying direction (one direction) was explained, in the second embodiment shown in FIGS. 11 to 13, a driving force transmitting mechanism can supply a recording material both in a normal direction and in a reverse direction. FIGS. 11 and 12 show an arrangement of the driving force transmitting mechanism, and FIG. 13 shows an operating sequence of the mechanism.

In FIGS. 11 and 12, the driving force transmitting mechanism includes a second roller gear 50 mounted on the roller shaft 26a of the first convey roller 26, a planetary gear 52 meshed with the second roller gear 50 to transmit a driving force from the second roller gear to the planetary gear, a lever 56 rotatably mounted on the first convey roller shaft 26a and having a portion for holding the planetary gear 52, a lever holding means 57 for preventing and permitting rotation of the lever 56, which holding means is rocked by an electromagnetic solenoid (not shown) and the like, a convey roller gear 53 mounted on the second convey roller shaft 28, a sheet supply roller gear 55 mounted on the sheet supply roller shaft 6, and an idle gear 54.

While the lever 56 is held by the lever holding means 57, regardless of normal direction or reverse direction with respect to a first sheet conveying direction, the planetary gear 52 is meshed with the roller gear 53 on the second convey roller shaft 28 to transmit the driving force from the first convey roller 26 to the second convey roller 27 (FIG. 11).

So long as the lever 56 is released by shifting the lever holding means 57 by means of the solenoid, the planetary gear 53 serves to be meshed with the roller gear 53 on the second convey roller shaft 28 to transmit the driving force from the first convey roller 26 to the second convey roller 27 when the first convey roller is rotated in the sheet conveying direction (normal direction) and be meshed with the idle roller 54 to transmit the driving force from the first convey roller 26 to the sheet supply roller 5 when the first convey roller 26 is rotated in the direction opposite to the sheet conveying direction (reverse direction) (FIG. 12).

FIG. 13 shows the sheet supplying operation effected by this apparatus. When the sheet supplying operation is started, the lever 56 is released from the lever holding means 57 by means of the solenoid (step S1301). Then, the drive motor is rotated in the direction opposite to the sheet conveying direction (reverse direction) by a predetermined number of pulses. As a result, the driving force is transmitted from the first convey roller 26 to the sheet supply roller 5 via the planetary gear 52, thereby rotating the sheet supply roller 5 to pick up the recording material (step S1302). When the drive motor is rotated reversely by the predetermined number of pulses, the tip end of the recording material is abutted against a nip between the second convey roller 27 and the urging roller 33 which are now stopped, and the trailing end of the recording material is held by the sheet supply roller 5, thereby forming a loop in the recording material.

Then, the drive motor 47 is rotated in the normal direction by a predetermined amount. As a result, the sheet supply roller 5 is stopped and the second convey roller 27 is rotated in the sheet conveying direction. Due to this operation, the tip end of the recording material is pulled by the second convey roller 27 and the urging roller 33 so that the recording material can be conveyed in the sheet conveying direction by the second convey roller 27. In this case, since the tip end of the recording material is pulled by the second convey roller 27 in a condition that the tip end of the recording material is abutted against the nip between the second convey roller 27 and the urging roller 33 and the loop is formed in the recording material, i.e. in a condition that the tip end of the recording material is aligned with the nip between the second convey roller 27 and the urging roller 33, the skew-feed of the recording material can be corrected with high accuracy and reliability (step S1303).

Incidentally, the number of pulses applied to the drive motor during its normal rotation is desirably selected so that the second convey roller 27 is not rotated excessively so as to apply a tension force to the recording material between the sheet supply roller 5 and the second convey roller 27 which are now stopped.

Then, the drive motor 47 is rotated again in the direction opposite to the sheet conveying direction to return the sheet supply roller to its original position (step S1304). Then, the drive motor 47 is rotated in the normal direction until the planetary gear is engaged by the roller gear 53. Then, the solenoid is turned OFF so that the lever 56 is held by the lever holding means 57 (step S1305). Then, the second convey roller is rotated in the sheet conveying direction to convey the recording material, by the first convey roller 26, to a recording position, where an image is recorded on the recording material by the recording head 40 (step S1306). As mentioned above, in this apparatus, the good sheet supplying ability can be obtained with inexpensive arrangement.

As mentioned above, according to the present invention, there is provided a sheet convey apparatus having an inexpensive sheet supply means capable of preventing the skew-feed of the sheet with high reliability.

What is claimed is:

1. A sheet convey apparatus comprising
   first convey means for conveying a sheet;
   second convey means for pinching and conveying the sheet conveyed by said first convey means, after a tip end of the sheet conveyed by said first convey means is abutted against a nip of said second convey means, to thereby correct skew-feed of the sheet; and
   a drive rotary member rotatable in a predetermined direction and a reverse direction opposite to the predetermined direction, said drive rotary member being movable into a first position and a second position, wherein in the first position the drive rotary member rotates in the predetermined direction to transmit a driving force from the drive rotary member to said first convey means to thereby drive said first convey means in a sheet conveying direction to convey the sheet in the sheet conveying direction, and
   wherein in order to transmit a driving force from the drive rotary member to said second convey means, the drive rotary member is moved into the second position in which the drive rotary member rotates in the reverse direction opposite to the predetermined direction to convey the sheet in the sheet conveying direction and rotates in the predetermined direction to convey the sheet in an opposite direction the sheet conveying direction.

2. A sheet convey apparatus according to claim 1, wherein said first convey means has a supply roller for feeding out a single sheet from a sheet stack.

3. A sheet convey apparatus according to claim 2, wherein said supply roller has a supply portion capable of being contacted with the sheet, and a non-supply portion which is not contacted with the sheet.

4. A sheet convey apparatus according to one of claims 1 to 3, wherein said second convey means has a pair of convey rollers.

5. A sheet convey apparatus according to any one of claims 1 to 3, further comprising control means for controlling said drive rotary member in such a manner that said drive rotary member drives said first convey means in said first position to abut the sheet against the nip of said second convey means which is now stopped, thereby forming a loop in the sheet, and then said drive rotary member is shifted to said second position where said second convey means is driven by a predetermined amount by said drive rotary member, and then said drive rotary member is again shifted to said first position where said first convey means is driven by said drive rotary member.

6. A sheet convey apparatus according to one of claims 1 to 3, wherein said drive rotary member has a planetary gear meshed with a sun gear.

7. A sheet convey apparatus according to claim 6, further comprising a first gear to be engaged by said planetary gear to be rotated to transmit a driving force to said first convey means when said drive rotary member is in said first position, and a second gear to be engaged by said planetary gear to be rotated to transmit a driving force to said second convey means when said drive rotary member is in said second position.

8. A sheet convey apparatus according to claim 7, wherein said drive rotary member is moved into said first position when said drive rotary member is rotated in the predetermined direction, and said drive rotary member is moved into said second position when said drive rotary member is rotated in the reverse direction.

9. A sheet convey apparatus according to claim 8, wherein said drive rotary member is rotated in said predetermined direction when said drive rotary member is in said first position, thereby driving said first convey means to convey the sheet to said second convey means, and wherein said drive rotary member is rotated in said reverse direction when said drive rotary member is in said second position, thereby driving said second convey means to convey the sheet in the sheet conveying direction.

10. A sheet convey apparatus comprising:
    a convey roller for conveying a sheet;
    an urging roller urged against said convey roller to generate a conveying force;
    a sheet containing portion arranged upstream of said convey roller in a sheet conveying direction for accommodating the sheets;
    a sheet supply roller for picking up the sheet from said sheet containing portion and for sending the sheet toward said convey roller, said sheet supply roller comprising a semi-circular sheet supply roller;

a drive shaft for generating a driving force for driving said convey roller and said sheet supply roller;

only one planetary gear to which the driving force is transmitted from a gear on said drive shaft and which can be engaged by a sheet supply roller gear on a shaft of said sheet supply roller to transmit the driving force to said sheet supply roller when said drive shaft is rotated in a predetermined direction, and which can be engaged by a convey roller gear on a shaft of said convey roller to transmit the driving force to said convey roller when said drive shaft is rotated in a reverse direction opposite to the predetermined direction; and control means for controlling rotation of said drive shaft in such a manner that said drive shaft is firstly rotated in the predetermined direction to rotate said sheet supply roller, thereby picking up the sheet from said sheet containing portion and abutting the sheet against a nip between said convey roller and said urging roller which are now stopped, and then said drive shaft is rotated in the reverse direction to convey the sheet by a predetermined amount in the sheet conveying direction in a condition that said sheet supply roller is in pressure contact with the sheet, and then said drive shaft is rotated in the predetermined direction again, thereby rotating said sheet supply roller to a predetermined position in which said semi-circular sheet supply roller is not in contact with the sheet, and then said drive shaft is rotated in the reverse direction to convey the sheet in the sheet conveying direction.

11. A sheet convey apparatus according to claim 10, wherein another convey roller is provided on said drive shaft.

12. A sheet convey apparatus comprising:

a convey roller for conveying a sheet;

an urging roller urged against said convey roller for generating a conveying force;

a sheet containing portion arranged upstream of said convey roller in a sheet conveying direction for accommodating the sheets;

a sheet supply roller for picking up the sheet from said sheet containing portion and for sending the sheet toward said convey roller;

a drive shaft for generating a driving force for driving said convey roller and said sheet supply roller;

only one planetary gear to which the driving force is transmitted from a gear on said drive shaft and which can be engaged by a sheet supply roller gear on a shaft of said sheet supply roller for transmitting the driving force to said sheet supply roller when said drive shaft is rotated in a predetermined direction, and which can be engaged by a convey roller gear on a shaft of said convey roller for transmitting the driving force to said convey roller when said drive shaft is rotated in a reverse direction opposite to the predetermined direction;

a lever for holding said only one planetary gear and having a bearing portion freely rotated on said drive shaft; and lever holding means for holding said lever at a predetermined position;

wherein said lever holding means holds the only one planetary gear in a position to be meshed with the convey roller gear so that the convey roller can convey the sheet in a sheet conveying direction and an opposite direction to the sheet conveying direction by the rotations of the only one planetary gear in the reverse and predetermined directions, and, only when a sheet supplying operation is effected, said lever is released by releasing said lever holding means and said drive shaft is rotated in the predetermined direction to rotate said sheet supply roller so as to pick up the sheet from said sheet containing portion and abut the sheet against the nip between said convey roller and said urging roller which are now stopped and then said drive shaft is rotated in the reverse direction.

13. A sheet convey apparatus according to claim 12, wherein said sheet supply roller comprises a semi-circular sheet supply roller, only when a sheet supplying operation is effected, said lever is released by releasing said lever holding means and said drive shaft is rotated in the predetermined direction to rotate said sheet supply roller so as to pick up the sheet from said sheet containing portion and abut the sheet against the nip between said convey roller and said urging roller which are now stopped, and then said drive shaft is rotated in the reverse direction in a condition that said sheet supply roller is in pressure contact with the sheet, thereby pinching the sheet between said convey roller and said urging roller to convey the sheet by a predetermined amount, and then said drive shaft is rotated in the predetermined direction again, thereby rotating said sheet supply roller to a predetermined position, and then said drive shaft is rotated in the reverse direction to convey the sheet in the sheet conveying direction.

14. A sheet convey apparatus according to claim 12, wherein another convey roller is provided on said drive shaft.

15. An image forming apparatus comprising:

first convey means for conveying a sheet;

second conveying means for pinching and conveying the sheet conveyed by said first convey means;

image forming means for forming an image on the sheet conveyed by said second convey means, wherein after a tip end of the sheet conveyed by said first convey means is abutted against a nip of said second convey means to correct skew-feed of the sheet, the sheet is conveyed by said second convey means; and a drive rotary member rotatable in a predetermined direction and a reverse direction opposite to the predetermined direction, said drive rotary member being movable into a first position and a second position, wherein in the first position the drive rotary member rotates in the predetermined direction to transmit a driving force from the drive rotary member to said first convey means so that the sheet is conveyed in a sheet conveying direction, and wherein in order to transmit a driving force from the drive rotary member to said second convey means, the drive rotary member is moved into the second position in which the drive rotary member rotates in the reverse direction opposite to the predetermined direction to drive the second convey means so that the sheet is conveyed in the sheet conveying direction and rotates in the predetermined direction to convey the sheet in an opposite direction to the sheet conveying direction.

16. A recording apparatus comprising:

a convey roller for conveying a sheet;

an urging roller urged against said convey roller to generate a conveying force;

a sheet containing portion arranged upstream of said convey roller in a sheet conveying direction and for accommodating the sheets;

a sheet supply roller for picking up the sheet from said sheet containing portion and for sending the sheet toward said convey roller, said sheet supply roller comprising a semi-circular sheet supply roller;

a drive shaft for generating a driving force for driving said convey roller and said sheet supply roller;

only one planetary gear to which the driving force is transmitted from a gear on said drive shaft and which can be engaged by a sheet supply roller gear on a shaft of said sheet supply roller to transmit the driving force to said sheet supply roller when said drive shaft is rotated a predetermined direction and which can be engaged by a convey roller gear on a shaft of said convey roller to transmit the driving force to said convey roller when said drive shaft is rotated in a reverse direction opposite to the predetermined direction;

control means for controlling rotation of said drive shaft in such a manner that said drive shaft is firstly rotated in the predetermined direction to rotate said sheet supply roller, thereby picking up the sheet from said sheet containing portion and abutting the sheet against a nip between said convey roller and said urging roller which are now stopped, and then said drive shaft is rotated in the reverse direction to convey the sheet by a predetermined amount in the sheet conveying direction in a condition that said sheet supply roller is in pressure contact with the sheet, and then said drive shaft is rotated in the predetermined direction again, thereby rotating said sheet supply roller to a predetermined position in which said semi-circular sheet supply roller is not in contact with the sheet, and then said drive shaft is rotated in the reverse direction to convey the sheet in the sheet conveying direction; and image forming means for forming an image on the sheet conveyed by said convey roller.

17. A recording apparatus comprising:

a convey roller for conveying a sheet;

image forming means for forming an image on the sheet conveyed by said convey roller;

an urging roller urged against said convey roller for generating a conveying force;

a sheet containing portion arranged at an upstream side of said convey roller in a sheet conveying direction and for accommodating the sheets;

a sheet supply roller for picking up the sheet from said sheet containing portion and for sending the sheet toward said convey roller;

a drive shaft for generating a driving force for driving said convey roller and said sheet supply roller;

only one planetary gear to which the driving force is transmitted from a gear on said drive shaft and which can be engaged by a sheet supply roller gear on a shaft of said sheet supply roller for transmitting the driving force to said sheet supply roller when said drive shaft is rotated in a predetermined direction, and which can be engaged by a convey roller to transmit the driving force to said convey roller when said drive shaft is rotated in a reverse direction opposite to the predetermined direction;

a lever for holding said only one planetary gear and having a bearing portion freely rotated on said drive shaft; and lever holding means for holding said lever at a predetermined position;

wherein said lever holding means holds the only one planetary gear in a position to be meshed with the convey roller gear so that the convey roller can convey the sheet in a sheet conveying direction and an opposite direction to the sheet conveying direction by the rotations of the only one planetary gear in the reverse and predetermined directions, and, only when a sheet supplying operation is effected, said lever is released by releasing said lever holding means and said drive shaft is rotated in the predetermined direction to rotate said sheet supply roller so as to pick up the sheet from said sheet containing portion and abut the sheet against the nip between said convey roller and said urging roller which are now stopped, and then said drive shaft is rotated in the reverse direction.

18. An image forming apparatus according to one of claims 15 to 17, wherein said image forming means has an ink jet head.

19. An image forming apparatus according to claim 18, wherein said ink jet head forms the image on the sheet by discharging an ink droplet by utilizing thermal energy.

* * * * *

UNITED STATES PATENT AND TRADEMARK OFFICE
CERTIFICATE OF CORRECTION

PATENT NO. : 6,139,010

DATED : October 31, 2000

INVENTOR(S): KATSUYUKI YOKOI

It is certified that error appears in the above-identified patent and that said Letters Patent is hereby corrected as shown below:

COLUMN 2:
Line 18, "loosen" should read --loosened--; and
Line 62, "loosen" should read --loosened--.

COLUMN 3:
Line 40, "rive" should read --drive--.

Signed and Sealed this

Twenty-fourth Day of April, 2001

Attest:

NICHOLAS P. GODICI

Attesting Officer

Acting Director of the United States Patent and Trademark Office